UNITED STATES PATENT OFFICE.

GEORG KALISCHER, OF MAINKUR, NEAR FRANKFORT-ON-THE-MAIN, GERMANY.

VAT COLOR AND PROCESS OF MAKING SAME.

1,285,727. Specification of Letters Patent. Patented Nov. 26, 1918.

No Drawing. Application filed February 28, 1916, Serial No. 80,839. Renewed April 30, 1918. Serial No. 231,746.

*To all whom it may concern:*

Be it known that I, GEORG KALISCHER, Ph. D., a subject of the King of Prussia, residing at Waldstrasse 23, at Mainkur, near Frankfort-on-the-Main, Germany, have invented a certain new Vat Color and Process of Making Same, of which the following is a full description.

I have discovered that by condensation of the 1-aminoanthraquinone-2-aldehyde with hydrazin, a new vat color of an intense claret red shade and very good properties of fastness is obtained of probably the following formula:

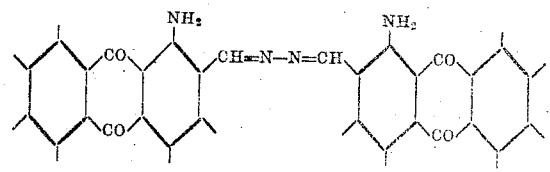

Instead of starting from the 1-aminoanthraquinone-2-aldehyde proper, the azomethine compounds derived from the aldehyde, of the general formula

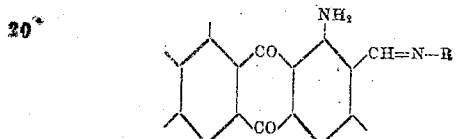

(where R represents any aromatic group), may be used with the same result. The formation of the dyestuff then takes place, the amin contained in the azomethine compound being probably split off and the 1-aminoanthraquinone-2-aldehyde thus formed taking part in the reaction.

The process of working is illustrated by the following examples:

Example 1: A solution containing 0.6 kilos hydrazin-hydrate is poured into a boiling solution of 5 kilos 1-aminoanthraquinone-2-aldehyde and 400 kilos glacial acetic acid. After heating for a short time, the dyestuff separates in the shape of thin crystals. The new coloring matter, being a dark red powder is very difficultly soluble in organic solvents of a high boiling point. In concentrated sulfuric acid the new dyestuff dissolves with an olive color which turns an intense greenish blue on the addition of paraformaldehyde. With hydrosulfite and caustic soda lye a blackish violet vat is obtained, dyeing cotton clear claret red shades of excellent fastness to washing, chloring and light.

Example 2: 6.5 kilos of the azomethine compound obtained from 1-aminoanthraquinone-2-aldehyde and anilin, of the following formula:

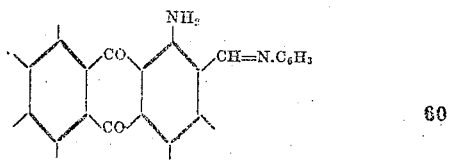

are dissolved in 150 kilos glacial acetic acid, and the solution thus obtained is mixed with a solution containing 0.6 kilos hydrazin hydrate. After half an hour's heating, the condensation is completed. The separated dyestuff corresponds in its properties completely with the dyestuff obtained when working according to Example 1. Instead of hydrazin hydrate mentioned in the examples, salts of hydrazin with the addition of alkalis may be used with the same result.

Having now particularly described and ascertained the nature of my said invention, and in what manner the same is to be performed, I declare that what I claim is:

1. The process of producing a new vat color, probably of the following formula:

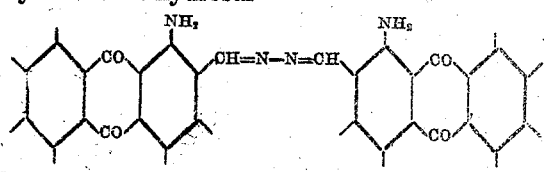

which consists in condensing 1-aminoanthraquinone-2-aldehyde with hydrazin; the dyestuff thus obtained represents a dark red powder, very difficultly soluble in solvents of a high boiling point, soluble in concentrated sulfuric acid with an olive color, which on the addition of paraformaldehyde is changed into an intense greenish blue, yielding with hydrosulfite and caustic soda lye a blackish violet vat which dyes cotton claret red shades of very good fastness, substantially as described.

2. The process of producing a new vat color, probably of the following formula:

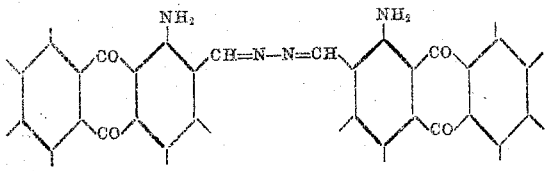

which consists in condensing the azomethine compounds derived from the 1-aminoanthraquinone-2-aldehyde, of the general formula:

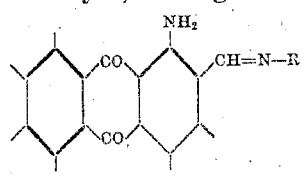

(where R represents any aromatic group), with hydrazin; the dyestuff thus obtained represents a dark red powder, very difficultly soluble in solvents of a high boiling point, soluble in concentrated sulfuric acid with an olive color, which, on addition of paraformaldehyde is changed into an intense greenish blue, yielding with hydrosulfite and caustic soda lye a blackish violet vat which dyes cotton claret red shades of very good fastness, substantially as described.

3. The herein described new vat dyestuff, deriving from 1-aminoanthraquinone-2-aldehyde and hydrazin, of probably the following formula:

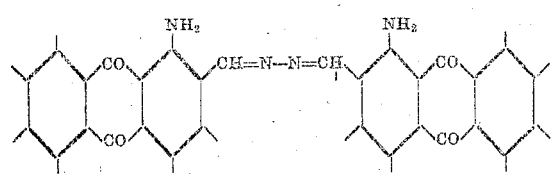

being a dark red powder, very difficultly soluble in organic solvents of a high boiling point, soluble in concentrated sulfuric acid with an olive color, which on addition of paraformaldehyde is changed into an intense greenish blue color, yielding a blackish violet vat with hydrosulfite and caustic soda lye, which dyes cotton claret red shades of very good fastness, substantially as described.

In witness whereof I have hereunto signed my name this 26th day of January 1916, in the presence of two subscribing witnesses.

Dr. GEORG KALISCHER.

Witnesses:
 JEAN GRUND,
 HARRY E. CARLSON.